(12) United States Patent
Ng et al.

(10) Patent No.: US 9,776,177 B2
(45) Date of Patent: Oct. 3, 2017

(54) BIMETAL CATALYSTS

(71) Applicant: Wayne State University, Detroit, MI (US)

(72) Inventors: K. Y. Simon Ng, West Bloomfield, MI (US); Steve O. Salley, Grosse Pointe Park, MI (US); Huali Wang, Detroit, MI (US)

(73) Assignee: Wayne State University, Detroit, MI (US)

( * ) Notice: Subject to any disclaimer, the term of this patent is extended or adjusted under 35 U.S.C. 154(b) by 321 days.

(21) Appl. No.: 14/388,709

(22) PCT Filed: Mar. 28, 2013

(86) PCT No.: PCT/US2013/034365
§ 371 (c)(1),
(2) Date: Sep. 26, 2014

(87) PCT Pub. No.: WO2013/149014
PCT Pub. Date: Oct. 3, 2013

(65) Prior Publication Data
US 2015/0038751 A1    Feb. 5, 2015

Related U.S. Application Data

(60) Provisional application No. 61/686,021, filed on Mar. 29, 2012.

(51) Int. Cl.
*B01J 27/22* (2006.01)
*B01J 27/24* (2006.01)
(Continued)

(52) U.S. Cl.
CPC .......... *B01J 29/7815* (2013.01); *B01J 21/04* (2013.01); *B01J 21/12* (2013.01); *B01J 23/88* (2013.01);
(Continued)

(58) Field of Classification Search
None
See application file for complete search history.

(56) References Cited

U.S. PATENT DOCUMENTS 2,539,414 A    1/1951  Frankenburg
4,325,842 A    4/1982  Slaugh et al.
(Continued)

FOREIGN PATENT DOCUMENTS

CA    2774315    2/2013

OTHER PUBLICATIONS

Kumaran et al, "Effect of Al-SBA-15 support on catalytic functionalities of hydrotreating catalysts I. Effect of variation of Si/Al ratio on catalytic functionalities," Applied Catalysis A: General 305, pp. 123-129, 2006.*

(Continued)

*Primary Examiner* — Colin W Slifka
(74) *Attorney, Agent, or Firm* — Brinks Gilson & Lione

(57) ABSTRACT

A catalyst comprises a carbide or nitride of a metal and a promoter element. The metal is selected from the group consisting of Mo, W, Co, Fe, Rh or Mn, and the promoter element is selected from the group consisting of Ni, Co, Al, Si, S or P, provided that the metal and the promoter element are different. The catalyst also comprises a mesoporous support having a surface area of at least about 170 m$^2$ g$^{-1}$, wherein the carbide or nitride of the metal and the promoter element is supported by the mesoporous support, and is in a non-sulfided form and in an amorphous form.

29 Claims, 11 Drawing Sheets

(51) Int. Cl.

| | |
|---|---|
| B01J 29/16 | (2006.01) |
| B01J 29/48 | (2006.01) |
| B01J 29/78 | (2006.01) |
| C10G 3/00 | (2006.01) |
| B01J 23/88 | (2006.01) |
| B01J 23/888 | (2006.01) |
| B01J 29/03 | (2006.01) |
| B01J 29/04 | (2006.01) |
| B01J 37/02 | (2006.01) |
| B01J 21/04 | (2006.01) |
| B01J 21/12 | (2006.01) |

(52) U.S. Cl.
CPC ............. *B01J 23/888* (2013.01); *B01J 27/22* (2013.01); *B01J 27/24* (2013.01); *B01J 29/0308* (2013.01); *B01J 29/041* (2013.01); *B01J 29/166* (2013.01); *B01J 29/48* (2013.01); *B01J 37/0201* (2013.01); *C10G 3/49* (2013.01); *Y02P 30/20* (2015.11)

(56) References Cited

U.S. PATENT DOCUMENTS

| | | |
|---|---|---|
| 4,522,708 A | 6/1985 | Leclercq et al. |
| 2002/0198101 A1 | 12/2002 | Gaffney |
| 2007/0010682 A1 | 1/2007 | Myllyoja et al. |
| 2008/0280754 A1 | 11/2008 | Toledo |
| 2008/0302001 A1 | 12/2008 | Koivusalmi et al. |

OTHER PUBLICATIONS

Ancheyta, J., et al., "Hydroprocessing of Heavy Oils and Residua", 1st Edition. CRC Press. ISBN 0-8493-7419-7, 2007, 355p.

Chu, Y., et al., "NiMoNx/γ-Al$_2$O$_3$ Catalyst for HDN of Pyridine", Applied Catalysis A: General, 1999, 176, pp. 17-26.

Claridge, J.B., et al., "Study of the Temperature-Programmed Reaction Synthesis of Early Transition Metal Carbide and Nitride Catalyst Materials From Oxide Precursors", Chemistry of Materials, 2000, 12, pp. 132-142.

Corma, A., "From Microporous to Mesoporous Molecular Sieve Materials and Their Use in Catalysis", Chemical Reviews, 1997, 97:(6), pp. 2373-2419.

Egeberg, G. R., et al., "Novel Hydrotreating Technology for Production of Green Diesel", presented at ERTC, 2009, (20p).

Egeberg, R. G., et al., "Industrial-Scale Production of Renewable Diesel", Published in PTQ Q3, 2011, www.eptq.com, (6p).

Furimsky, E., "Metal Carbines and Nitrides as Potential Catalysts for Hydroprocessing", Applied Catalysis A: General, 2003, 240, pp. 1-28.

Han, J., et al., "Nanostructured Molybdenum Carbides Supported on Carbon Nanotubes as Efficient Catalysts for One-Step Hydrodeoxygenation and Isomerization of Vegetable Oils", Green Chemistry, 2011, 13, (9), pp. 2561-2568.

Han, J.X., et al., "Carbon-Supported Molybdenum Carbide Catalysts for the Conversion of Vegetable Oils", Chemsuschem, 2012, 5, pp. 727-733.

Huber, G. W., et al., "Synergies Between Bio- and Oil Refineries for the Production of Fuels From Biomass", Angew. Chem. Int. Ed., 2007, 46, pp. 7184-7201.

Iglesia, E., et al., "Synthesis, Characterization, and Catalytic Properties of Clean and Oxygen-Modified Tungsten Carbides", Catalysis Today, 1992, 15, pp. 307-337.

Immer, J.G., et al., "Catalytic Reaction Pathways in Liquid-Phase Deoxygenation of C18 Free Fatty Acids", Applied Catalysis A: General, 2010, 375, pp. 134-139.

Klein, Lisa, C., "Sol-Gel Coatings", J. of Thin Film Processes II, 1991, pp. 501-520.

Kragten, D.D., et al., "Structure of the Silica Phase Extracted From Silica/(TPA)OH Solutions Containing Nanoparticles", J. Phys. Chem. B., 2003, 107, pp. 10006-10016.

Kubička, D., et al., "Transformation of Vegetable Oils into Hydrocarbons Over Mesoporous-Alumina-Supported CoMo Catalysts", Topics in Catalysis, 2009, 52, pp. 161-168.

Lee, J.S., et al., "In Situ Carburization of Metallic Molybdenum During Catalytic Reactions of Carbon-Containing Gases", Catalysis Letters, 1993, 20, pp. 97-106.

Lee, J.S., et al., "Molybdenum Carbide Catalysts 1. Synthesis of Unsupported Powders", Journal of Catalysis, 1987, 106, pp. 125-133.

Ma, X, et al., "Effect of Methyl Groups at 4- and 6-Positions on Adsorption of Dibenzothiophenes Over CoMo and NiMo Sulfide Catalysts", Fuel Chemistry Division Preprints, 2008, 48, pp. 135-137.

Mäki-Arvela, P., et al., "Catalytic Deoxygenation of Fatty Acids and Their Derivatives", Energy & Fuels, 2006, 21, (1), pp. 30-41.

Mäki-Arvela, P., et al., "Catalytic Deoxygenation of Tall Oil Fatty Acid over Palladium Supported on Mesoporous Carbon", Energy & Fuels, 2011, 25, (7), pp. 2815-2825.

Monnier, J., et al., "Hydrodeoxygenation of Oleic Acid and Canola Oil Over Alumina-Supported Metal Nitrides", Applied Catalysis A: General, 2010, 382, (2), pp. 176-180.

Murata, K., et al., Production of Synthetic Diesel by Hydrotreatment of Jatropha Oils Using Pt-Re/H-ZSM-5 Catalyst. Energy & Fuels, 2010, 24, (4), 2404-2409.

Nasikin, M., et al., "Biogasoline from Palm Oil by Simultaneous Cracking and Hydrogenation Reaction over NiMo/zeolite Catalyst", World Applied Sciences Journal, 2009, 5 (Special Issue for Environment).

Nemanashi, M., et al., "Synthesis and Characterization of Cu, Ag and Au Dendrimer-Encapsulated Nanoparticles and Their Application in the Reduction of 4-Nitrophenol to 4-Aminophenol", Colloid and Interface Science, 2013, 389, pp. 260-267.

Panpranot, J., et al., "Effect of Cobalt Precursors on the Dispersion of Cobalt on MCM-41", Catalysis Letters 2003, 91, (1), pp. 95-102.

Park, K.W., et al., "Origin of the Enhanced Catalytic Activity of Carbon Nanocoil-Supported PtRu Alloy Electrocatalysts", J. Phys. Chem. B, 2004, 108, pp. 939-944.

Radkevich, V.Z., et al., "The Influence of Surface Functionalization of Activated Carbon on Palladium Dispersion and Catalytic Activity in Hydrogen Oxidation", Applied Catalysis A: General, 2008, 335, pp. 241-251.

Rantanen, L., et al., "NExBTL Biodiesel Fuel of the Second Generation", SAE International—Technical Paper, (17p).

Scherzer, J. et al., "Hydrocracking Catalysts", Science and Technology, 1st Edition. CRC Press. ISBN 0-8247-9760-4., 1996, pp. 13-15.

Seco, A.M., et al., "Densification of Hybrid Silica-Titania Sol-Gel Films Studied by Ellipsometry and FTIR", Materials Science and Engineering B76, 2000, pp. 193-199.

Simakova, I., et al., "Decarboxylation of Fatty Acids Over Pd Supported on Mesoporous Carbon", Catalysis Today 150, 2010, pp. 28-31.

Sing, K.S.W., "Reporting Physisorption Data for Gas/Solid Systems with Special Reference to Theetermination of Surface Area and Porosity" (Recommendations 1984), Pure and Applied Chemistry, 57, pp. 603-619.

Snare, M., et al., "Catalytic Deoxygenation of Unsaturated Renewable Feedstocks for Production of Diesel Fuel Hydrocarbons", Fuel, 2008, 87, pp. 933-945.

Snare, M., et al., "Heterogeneous Catalytic Deoxygenation of Stearic Acid for Production of Biodiesel", Ind. Eng. Chem. Res., 2006, 45, pp. 5708-5715.

Sotelo-Boyás, R., et al. "Renewable Diesel Production From the Hydrotreating of Rapeseed Oil With Pt/Zeolite and NiMo/Al$_2$O$_3$ Catalysts", Ind. Eng. Chem. Res. 2011, 50, pp. 2791-2799.

Stumborg, M., et al., "Hydroprocessed Vegetable Oils for Diesel Fuel Improvement", Bioresource Technology, 1996, 56, (1), pp. 13-18.

(56) References Cited

OTHER PUBLICATIONS

Thompson, L.T., "*Nanostructured Carbide and Nitride Catalysts*", Abstracts of Papers of the American Chemical Society, 2009, 237, (1p).

Tripathi, B.P., et al., "*Organic-Inorganic Nanocomposite Polymer Electrolyte Membranes for Fuel Cell Application*", Progress in Polymer Science, 2011, 36, pp. 945-979.

Van Der Vis, et al., "*The Thermodynamic Properties of Tetraethoxysilane (TEOS) and an Infrared Study of Its Thermal Decomposition*", Journal De Physique IV Colloque C3, 1993, vol. 3, pp. 75-82.

Wan, Y., et al., "*Ordered Mesoporous Pd/Silica-Carbon as a Highly Active Heterogeneous Catalyst for Coupling Reaction of Chlorobenzene in Aqueous Media*", J. Am. Chem. Soc., 2009, 131, pp. 4541-4550.

Wang, H., et al., "*Biofuels Production From Hydrotreating of Vegetable Oil Using Supported Noble Metals, and Transition Metal Carbide and Nitride*", Wayne State University Dissertations, Paper 485, (134p). http://digitalcommons.wayne.edu/oa_dissertations.

Wang, H., et al., "*Hydrocarbon Fuels Production From Hydrocracking of Soybean Oil Using Transition Metal Carbides and Nitrides Supported on ZSM-5*", American Chemical Society—I&EC Research, 2012, vol. 51, pp. 10066-10073.

Wang, H., et al., "*Jet Fuel Hydrocarbons Production From Catalytic Cracking and Hydrocracking of Soybean Oil*", Current Catalysis, 2012, vol. 1, p. 132-139.

Wang, Z.M., et.al., "*Optimization of Biodiesel Production From Trap Grease Via Acid Catalysis*", Korean J. Chem. Eng., 2008, 25, pp. 670-674.

Wu, S., et al., "*Synthesis, Characterization, and Catalytic Performance of Mesoporous Al-SBA-15 for Tert-butylation of Phenol*", Chinese Journal of Catalysis, 2006, 27, (1), 9-14.

Yang, H. et al., "*A Simple Melt Impregnation Method to Synthesize Ordered Mesoporous Carbon and Carbon Nanofiber Bundles with Graphitized Structure from Pitches*", J. Phys. Chem. B, 2004, 108, pp. 17320-17328.

Zhang, W., et al., "*Catalytic Activities of NiMo Carbide Supported on $SiO_2$ for the Hydrodeoxygenation of Ethyl Benzoate, Acetone, and Acetaldehyde*", American Chemical Society, Energy Fuels, 2010, vol. 24, pp. 2052-2059.

Zuo, H.L., et al., "*Hydrodeoxygenation of Methyl Palmitate Over Supported Ni Catalysts for Diesel-Like Fuel Production*", American Chemical Society, Energy Fuels, 2012, 26, pp. 3747-3755.

\* cited by examiner

BIMETAL CATALYSTS

This application is the national phase application out of PCT/US2013/034365, filed Mar. 28, 2013, which claims priority to U.S. Provisional Patent Application No. 61/686,021, filed Mar. 29, 2012, the entireties of both of which are hereby incorporated by reference.

This invention was made with government support awarded by the Department of Energy (Grant DE-FG36-05GO85005) and National Institute of Food and Agriculture (Grant MICW-2010-01534). The government has certain rights in the invention.

FIELD

The present disclosure relates to novel bimetal catalysts.

BACKGROUND

Due to volatility in the price of fossil fuels, and energy security and environmental concerns, economical techniques for the production of biofuels from alternative and renewable sources must be developed. It is known that triglyceride based vegetable oils, animal fats, and recycled grease have the potential to be suitable sources of fuel under the right processing conditions.

BRIEF SUMMARY

In one aspect, a catalyst comprises a carbide or nitride of two early transition metals, and a mesoporous support. The mesoporous support has a surface area of at least about 170 $m^2\ g^{-1}$. The carbide or nitride of the two early transition metals is supported by the mesoporous support and in an amorphous form.

In another aspect, a process comprises contacting a catalyst with a reaction. The catalyst catalyzes the reaction. The catalyst comprises a carbide or nitride of two early transition metals, and a mesoporous support. The mesoporous support has a surface area of at least about 170 $m^2\ g^{-1}$. The carbide or nitride of the two early transition metals is supported by the mesoporous support and in an amorphous form.

In yet another aspect, a process comprises contacting a material that comprises a glyceride with hydrogen in the presence of a catalyst such that at least some of the glyceride is converted into one or more gasoline to diesel range hydrocarbons. The catalyst catalyzes the hydrocarbon formation. The catalyst comprises a carbide or nitride of two early transition metals, and a mesoporous support. The mesoporous support has a surface area of at least about 170 $m^2\ g^{-1}$. The carbide or nitride of the two early transition metals is supported by the mesoporous support and in an amorphous form.

In further another aspect, a process comprises contacting a material that comprises a free fatty acid with hydrogen in the presence of a catalyst such that at least some of the free fatty acid is converted into one or more gasoline to diesel range hydrocarbons. The catalyst catalyzes the formation of hydrocarbon. The catalyst comprises a carbide or nitride of two early transition metals, and a mesoporous support. The mesoporous support has a surface area of at least about 170 m2 g-1. The carbide or nitride of the two early transition metals is supported by the mesoporous support and in an amorphous form.

DETAILED DESCRIPTION

Figure 1:
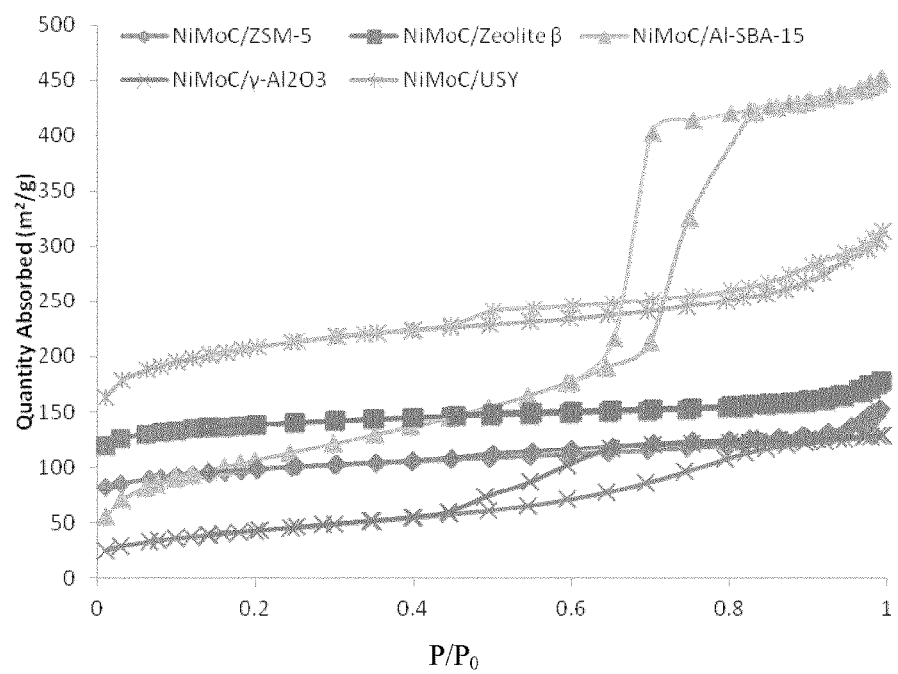
FIG. 1 illustrates the nitrogen adsorption-desorption isotherms of the five supported NiMoC catalysts.

Currently, lipid-based feedstocks can be converted into liquid hydrocarbon fuels by hydrotreating processes similar to what is found in the oil and gas refining industry. Conventional γ-$Al_2O_3$ supported sulfided bimetallic catalysts (usually Mo- or W-based sulfides promoted with Ni or Co) that are presently used for desulfurization of fossil diesel streams are used in the process under high energy consumption conditions, with high temperature, high pressure, and large amounts of hydrogen consumption. The products obtained are essentially n-paraffins (n-$C_{15}$ up to n-$C_{18}$) solidifying at subzero temperatures and as such they are unsuitable for high quality diesel fuels, kerosene and gasoline compounds. The process is costly and the yield of product can be low because of the formation of coke, which causes catalyst deactivation and pressure build-up in the reactor. More importantly, the base metals in these hydrocracking catalysts need to be maintained in their sulfided form in order to be active at process conditions, and therefore a sulfurization co-feed needs to be added to the feedstock.

In order to address the above issues, a number of studies have been carried out to develop non-sulfided catalysts with high activity, good selectivity and long lifetime in a hydrotreating process. Among them, the nitrides and carbides of early transition metals have been identified as a new class of hydrotreating catalysts which are competitive with the conventional bimetallic sulfided catalysts. These catalysts exhibit high activity similar to the noble metals because the introduction of carbon or nitrogen into the lattice of the early transition metals results in an increase of the lattice parameter $a_0$ and an increase in the d-electron density. It has been reported that a transition metal carbide catalyst, $Mo_2C$, supported on multi-walled carbon nanotubes showed 90% conversion and 91% hydrocarbon selectivity for one-step conversion of vegetable oils into branched diesel-like hydrocarbons. Nitrides of molybdenum, tungsten and vanadium supported on γ-$Al_2O_3$ were also used for hydrodeoxygenation of oleic acid and canola oil. The oxygen removal exceeded 90% over the supported molybdenum catalyst for a long reaction duration (450 hours) and the yield of middle distillate hydrocarbons (diesel fuel) ranged between 38 and 48 wt %. Moreover, bimetallic nitride and carbide catalysts were found to be much more active and stable than the mono-metallic ones even though no application in the biomass hydrotreating process has been reported.

While the nitrides and carbides of early transition metals have been evaluated as hydrotreating catalysts to convert vegetable oils to biofuels, no complete information exists on the effect of the support on the hydrotreating activity of the catalysts, even though the support plays an important role in the cracking function for hydrotreating catalysts. The support contributes to the cracking of the C—O or C—C bond and to the isomerization of the resultant n-olefins, which, after hydrogenation, are transformed into isoparaffins. Hence, the aim of this work is to prepare bimetallic (NiMo) carbide catalysts supported on different supports and investigate the support effects on the catalyst hydrotreating activity.

In this study, the preparation of Al-SBA-15 with Si/Al=80 and hydrotreating catalysts based on this mesoporous material along with commercialized γ-$Al_2O_3$, ZSM-5, Zeolite β and USY zeolite are presented. Nickel and molybdenum are impregnated as active metals. The carbides of the catalysts were evaluated for hydrotreating of soybean oil in a bench-scale plug flow reactor.

According to one embodiment of the present disclosure, as an alternative to conventional sulfide catalysts, NiMo carbide catalysts were prepared by precipitation method and studied for the hydrotreating of soybean oil to produce hydrocarbons in the gasoline to diesel range. The effect of the catalyst supports on activity and selectivity was investigated by using three different types of materials: mesoporous material (Al-SBA-15), nanostructured alumina (γ-$Al_2O_3$) and zeolites (ZSM-5, Zeolite β and USY). The structural characterization of the catalysts was measured by using XRD, BET, XPS and TEM. Catalytic tests were carried out in a bench scale flow reactor at 400° C. and 650 psi. The results showed that the Al-SBA-15 supported catalyst has the highest surface area of 711.5 $m^2$ $g^{-1}$ and largest pore volume of 0.71 $cm^{-3}$ $g^{-1}$. Among the five catalysts, hydrotreating on NiMoC/Al-SBA-15 gave the highest yield of organic liquid product (96%) and highest selectivity (97%) to hydrocarbons in the boiling range of the diesel fraction. While for the three zeolite supported catalysts, hydrotreating of soybean oil produced more hydrocarbon products in the boiling range of green gasoline (about 15-40%).

According to another embodiment of the present disclosure, a series of NiWC/Al-SBA-15 catalysts were prepared. The effect of Ni—W ratio on the catalyst efficiency in catalyzing corn oil to organic liquid products (OLPs) was studies. The structure and metal distribution of the NiWC/Al-SBA-15 catalysts were characterized. Among the NiWC/Al-SBA-15 catalysts studied with Ni—W ratios of 1:9, 1:1, 2:1 and 9:1, the catalyst with 9:1 N—W ratio was most efficient and selective in catalyzing corn oil to OLP conversion. Data showed that catalysts with higher activity, selectivity, and durability are mesoporous in form, with no observed bimetallic alloy formation in the catalyst. These catalysts also tend to have the metals well-distributed on the support.

According to still another embodiment of the present disclosure, a catalyst comprises carbides of a metal and a promoter element, and a support having a surface area of at least about 170 $m^2$ $g^{-1}$. The carbides of the metal and the promoter element are supported by the support.

According to still another embodiment of the present disclosure, a catalyst comprises nitrides of a metal and a promoter element, and a support having a surface area of at least about 170 $m^2$ $g^{-1}$. The nitrides of the metal and the promoter element are supported by the support.

According to still another embodiment of the present disclosure, a catalyst comprises a carbide of a metal promoted by a promoter element, and a support having a surface area of at least about 170 $m^2$ $g^{-1}$. The carbide is supported by the support.

According to yet still another embodiment of the present disclosure, a catalyst comprises a nitride of a metal promoted by a promoter element, and a support having a surface area of at least about 170 $m^2$ $g^{-1}$. The nitride is supported by the support.

Preferably, the catalysts have a mesoporous structure. Preferably, the majority of the carbide or nitride is amorphous.

Preferably, the support has a surface area of at least about 200 $m^2$ $g^{-1}$, more preferably of at least about 300 $m^2$ $g^{-1}$, even more preferably of at least about 400 $m^2$ $g^{-1}$, still more preferably of at least about 450 $m^2$ $g^{-1}$, even more preferably of at least about 500 $m^2$ $g^{-1}$, still more preferably of at least about 600 $m^2$ $g^{-1}$, yet still more preferably of at least about 700 $m^2$ $g^{-1}$, further more preferably of at least about 800 $m^2$ $g^{-1}$, still further more preferably of at least about 900 $m^2$ $g^{-1}$, and yet still further more preferably of at least about 1,000 $m^2$ $g^{-1}$.

Preferably, the support has a pore volume of at least about 0.1 $cm^3$ $g^{-1}$, more preferably of at least about 0.2 $cm^3$ $g^{-1}$, still more preferably of at least about 0.3 $cm^3$ $g^{-1}$, further more preferably of at least about 0.4 $cm^3$ $g^{-1}$, still further more preferably of at least about 0.5 $cm^3$ $g^{-1}$, yet still more preferably of at least about 0.6 $cm^3$ $g^{-1}$, and still further more preferably of at least about 0.7 $cm^3$ $g^{-1}$.

Preferably, the metal is Mo, W, Co, Fe, Rh or Mn. Preferably, the metal is Mo. Preferably, the metal is W.

Preferably, the promoter element is Ni, Co, Al, Si, S or P. Preferably, the promoter element is Ni. Preferably, the promoter element is Co.

According to still another embodiment of the present disclosure, the catalysts can further comprise a carbide of another metal. According still another embodiment of the present disclosure, the catalysts can further comprise a nitride of another metal.

Preferably, the support is selected from the group consisting of $Al_2O_3$, $SiO_2$, a zeolite, $ZrO_2$, $CeO_2$, a mesoporous material, a clay, and combinations thereof. More preferably, the support is selected from the group consisting of ZSM-5, zeolite β, USY, γ-$Al_2O_3$, Al-SBA-15, MCM-14, diatomite and combinations thereof. Even more preferably, the support is Al-SBA-15.

According to one embodiment of the present disclosure, the support is a mesoporous silica, preferably mesoporous silica nanoparticles with 4.6 to 30 nanometer pores, such as SBA-15, which has average pore diameter of 8-11 nanometer. In another example, the support is an aluminosilicate zeolite mineral belonging to the pentasil family of zeolites, such as ZSM-5.

According to further another embodiment of the present disclosure, a catalyst comprises NiMoC supported on Al-SBA-15.

According to still another embodiment of the present disclosure, a catalyst comprises NiMoN supported on Al-SBA-15.

According to another embodiment of the present disclosure, a catalyst comprises NiWC supported on Al-SBA-15.

According to still another embodiment of the present disclosure, a catalyst comprises NiWN supported on Al-SBA-15.

According another embodiment of the present disclosure, a process comprises contacting any catalyst of the present disclosure with a reaction, the catalyst catalyzing the reaction. In one example, the reaction is a hydrodeoxygenation reaction. In another example, the reaction is a hydrocracking reaction. In still another example, the reaction comprises both a hydrodeoxygenation reaction and a hydrocracking reaction, and the catalyst catalyzes both the hydrodeoxygenation and hydrocracking reactions.

According yet another embodiment of the present disclosure, a process comprises contacting a material that comprises a glyceride with hydrogen in the presence of any catalyst of the present disclosure such that at least some of the glyceride is converted into one or more gasoline to diesel range hydrocarbons. In one example, the material further comprises a free fatty acid, and wherein at least some of the free fatty acid is converted into one or more gasoline to diesel range hydrocarbons Preferably, the glyceride comprises a triglyceride or a diglyceride.

In one example, the material is a non-refined oil. In another example, the material is selected from the group consisting of a crude oil, a waste oil, an animal fat, and combinations thereof.

In one example, the material further comprises water, and wherein the water content in the material is more than about 0.15 weight %. In another example, the water content in the material is more than about 2 weight %. In yet another example, the water content in the material is more than about 5 weight %. In still another example, the water content in the material is more than about 10 weight %.

In one example, the material further comprises one or more free fatty acids, and wherein the free fatty acid content in the material is more than about 0.5 weight %. In another example, the free fatty acid content in the material is more than about 2 weight %. In still another example, the free fatty acid content in the material is more than about 3.5 weight %. In further another example, the free fatty acid content in the material is more than about 10 weight %.

According to still another embodiment of the present disclosure, a process comprises contacting a material that comprises a free fatty acid with hydrogen in the presence of the catalyst of the present disclosure such that at least some of the free fatty acid is converted into one or more gasoline to diesel range hydrocarbons.

EXAMPLES

Preparation of Al-SBA-15

Al-SBA-15 with Si/Al=80 was synthesized following the synthesis procedure of Wu et al., Synthesis, Characterization, and Catalytic Performance of Mesoporous Al-SBA-15 for Tert-butylation of Phenol. *Chinese Journal of Catalysis* 2006, 27, (1), 9-14, the entirety of which is hereby incorporated by reference. A typical synthesis procedure was as the following: 20 grams of commercialized SBA-15 powder (ACS Materials, LLC, Medford, Mass.) was dispersed in 150 mL hexane. Then, 0.067 g aluminum isopropoxide dispersed in a small amount of hexane was added with stirring. After 10 minutes, the solution was diluted by adding more hexane (150 mL) and the stirring was continued for another 24 h at room temperature. The mixture was filtered and the retentate was washed thoroughly with hexane followed by overnight drying at 60° C. Finally, the solid products were calcined at 773 K for 4 h to obtain Al-SBA-15 with a final Si/Al ratio of 80.

Catalyst Preparation

The oxide precursors were prepared through incipient wetness impregnation of Al-SBA-15, γ-Al$_2$O$_3$, ZSM-5, Zeolite β or USY zeolite using aqueous solutions with the appropriate salts. The γ-Al$_2$O$_3$ support was supplied by US Research Nanomaterials, Inc., Houston, Tex. All of the zeolite supports were purchased from Zeolyst International, Kansas City, Kans. All support materials were calcined at 350° C. before usage to stabilize the crystal structure. For the impregnation, 10 g of Ni(NO$_3$)$_2$ and 7.3 g of (NH$_4$)$_6$Mo$_7$O$_{24}$·4H$_2$O (Sigma Aldrich, St. Louis, Mo.) were dissolved in a volume of water equal to the total pore volume of the catalyst support. This solution was then immediately poured over 40 g of catalyst support and agitated slightly to ensure that the entire pore volume of the catalyst was impregnated. Following this, the impregnated catalyst was placed in a 50° C. oven for 12 hours, and then dried in a programmable high-temperature oven for 12 hours at 120° C., followed by calcination at 400° C. for 6 hours.

The final step in the procedure was the carburization or nitriding of the metal oxide precursor using a temperature-programmed reduction (TPR). First, 10 grams of the metal oxide precursor was loaded into a quartz reactor and placed in a temperature-controlled oven. Then the carburization was carried out using a flow of 250 cm$^3$ min$^{-1}$ of 20 vol % CH$_4$/H$_2$ over the metal oxides at a heating rate of 10 K min$^{-1}$ to 250° C. and then at 1.98 K min$^{-1}$ to a final temperature of 730° C., which previous studies have shown to be suitable for carbide formation. In the final stage, the temperature was maintained at 730° C. for half an hour to complete the reaction. The ammonia nitridation of oxides was carried out in a flow of 100 cm$^3$ min$^{-1}$ of ammonia. In the first stage, the temperature was increased at 10 K min$^{-1}$ to 250° C. In the second stage, the temperature was raised to 700° C. and held for half an hour. Finally, the sample was cooled down to room temperature in argon and then passivated in flowing mixed gases (1% O$_2$/Ar) for 2 hours.

To prepare the NiWC catalysts, 150 mL distilled water was added to each one of the metal salts as shown in Table 1 below. The solutions were heated at 50° C. with stirring until the salts were dissolved. 4 g of the support (for example, Al-SBA-15) was added to each solution and the solutions were kept on a heater with stirring until the solutions dried. The solids were placed in the oven at 120° C. overnight, followed by calcination at 450° C. for 4 hours. The carburization or nitriding of the NiW metal oxide precursor were carried out as described above.

TABLE 1

| | Weights of Metal Salts | |
|---|---|---|
| | Salt Weight (g) | |
| Ni—W Ratio | N$_2$NiO$_6$·6H2O | (NH$_4$)$_{10}$H$_2$(W$_2$O$_7$)$_6$·xH$_2$O |
| 1:9 | 0.25 | 0.565 |
| 1:1 | 1.23 | 0.32 |
| 2:1 | 1.66 | 0.21 |
| 9:1 | 2.25 | 0.065 |

Catalyst Characterization

An X-ray Diffraction (XRD) analysis was carried out using a Rigaku RU2000 rotating anode powder diffractometer (Rigaku Americas Corporation, TX) at a scan rate of 4°/min.

A Brunauer-Emmett-Teller (BET) analysis was carried out to determine the surface area and pore size of the catalysts using a Micromeritics model ASAP 2010 surface area analyzer (Micromeritics Instrument Corporation, GA), with nitrogen (99.99% purity) as the analysis gas. The catalyst samples were heated to 150° C. at a rate of 10° C./min and then held for 2 hours under a nitrogen atmosphere, and the adsorption/desorption isotherms were acquired at 77.35 K using a 5 second equilibrium time interval. The catalyst samples were degassed at 150° C. for 6 hours prior to analysis to remove any adsorbed molecules from the pores and surfaces.

Transmission electron microscopy (TEM) of the samples was done on a JEOL-2010 FasTEM microscope operating at 100 kV. The calcined sample was dispersed in hexane, deposited on a Cu grid and dried. Aluminum content in Al-SBA-15 was estimated by EDAX.

XPS analysis was performed with a PHI 5500 system (PerkinElmer, Wellesley, Mass.), using a monochromatic Al Kα X-ray radiation source (1486.6 eV) and AugerScan system control (RBD Enterprises, Bend, Oreg.). Elemental concentration on the sample surface was measured by XPS multiplex scan (spot size: ~1 mm diameter).

Activity Tests

Catalysts activity tests were carried out in a BTRS-Jr® tubular reactor (Autoclave Engineers, PA) using soybean oil as a feedstock. The reactor is a fixed bed reactor with the dimension of 1.31 cm i.d.×61 cm. Approximately 2 g of the catalyst was loaded in the reactor. Quartz beads with a size about 200 μm were used to dilute the catalyst bed at a 1:1 (v/v) ratio in order to improve the mass and heat transfer of the catalyst beds. Prior to the reaction, the catalyst was reduced in a hydrogen flow (50 mL/min) at 450° C. for two hours. The reactions were carried out at 400° C. and 650 psi. After the temperature and pressure were stabilized, soybean oil was fed at 1 $h^{-1}$ liquid hourly space velocity (LHSV) while maintaining hydrogen flow rate at 50 mL/min. The liquid and gaseous products were separated in the gas-liquid-separator after the reaction. An experiment was considered to be in a steady state when the liquid product yield and the selectivity for gasoline to diesel range hydrocarbons maintain relatively constant on a daily basis, usually after 4-5 days on stream. Gaseous products were analyzed by an online gas chromatograph (Perkin Elmer, Calculus 500) equipped with a built-in Arnel Model 2106 Analyzer and a thermal conductivity detector (TCD). Helium and nitrogen were used as carrier gases. Liquid samples were collected at intervals of 24 h. The organic liquid product (OLP) was separated from the aqueous phase using a syringe. Hydrocarbon fuels in the OLP, such as gasoline ($C_5$-$C_{12}$), jet fuel ($C_8$-$C_{16}$) and diesel ($C_{12}$-$C_{22}$), were analyzed quantitatively using a GC with a capillary glass column (100% dimethyl polysiloxane 60 m×0.32×1.0 μm, Restek, PA) and a flame ionization detector. Conversion (%), OLP yield (%), and product selectivity in OLP (%) are defined as the following:

$$\text{Conversion (\%wt)} = \frac{F - R}{F} \times 100$$

$$\text{OLP yield (\%wt)} = \frac{P_{OLP}}{F} \times 100$$

$$\text{Product selectivity in } OLP \text{ (\%wt)} = \frac{P_{gasoline, kerosene, or\ diesel}}{P_{OLP}} \times 100$$

Where F and R are the weight of feed soybean oil and residue oil in the product respectively, P is the product weight (OLP, gasoline, kerosene, or diesel).

Catalyst Characterization Results

FIG. 1 illustrates the nitrogen adsorption-desorption isotherms of the five supported NiMoC catalysts. According to De Boer's theory the isotherm curve of NiMoC/Al-SBA-15 is type IV and the adsorption hysteresis loop is type A, which means that NiMoC/Al-SBA-15 has a meso porous structure with uniform regular channel distribution. The specific adsorption capacity is as high as 450 $m^2$/g. NiMoC/γ-$Al_2O_3$ shows a type IV isotherm curve and the adsorption hysteresis loop is type E, indicating that NiMoC/γ-$Al_2O_3$ catalyst has a meso-porous structure with irregular and non-uniform channels. Its specific adsorption capacity is also much lower than NiMoC/Al-SBA-15.

The other three zeolite supported catalysts (NiMoC/ZSM-5, NiMoC/Zeolite β and NiMoC/USY) exhibited profiles of microporous structures (Type I isotherms) with relatively small external surface, which is characterized by an initial rapid increase in the amount adsorbed and a long nearly flat region at higher pressures. The specific adsorption capacity follows this order: NiMoC/USY>NiMoC/ZSM-5 and NiMoC/Zeolite β. In addition, Table 2 lists the textural properties of the catalysts. It can be observed that NiMoC/Al-SBA-15 has the highest surface area (711.5/$m^2$ $g^{-1}$) compared to the other four catalysts.

TABLE 2

Textural Properties of NiMoC Catalysts Using Different Supports

| Catalyst | Surface Area ($m^2$ $g^{-1}$) | Pore Volume ($cm^{-3}$ $g^{-1}$) |
|---|---|---|
| NiMoC/ZSM-5 | 446.8 | 0.13 |
| NiMoC/Zeolite β | 466.7 | 0.09 |
| NiMoC/USY | 475.6 | 0.25 |
| NiMoC/γ-$Al_2O_3$ | 216.0 | 0.21 |
| NiMoC/Al-SBA-15 | 711.5 | 0.71 |

Figure 2:
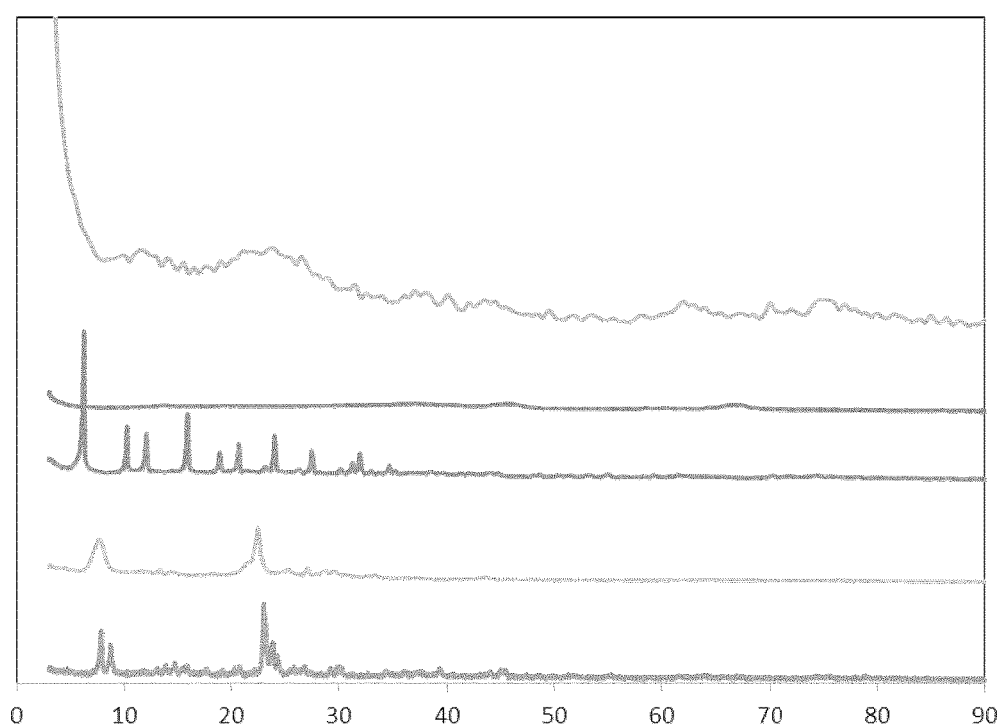
FIG. 2 illustrates the X-ray diffraction spectrograms of the five supported carbide catalysts within the range of 3-90° (NiMoC/Al-SBA-15, NiMoC/γ-$Al_2O_3$, NiMoC/USY, NiMoC/Zeolite β and NiMoC/ZSM-5, from top to bottom).

FIG. 2 illustrates the X-ray diffraction spectrograms of the five supported carbide catalysts within the range of 3-90o. No characteristic peaks belonging to Ni/Mo carbides or oxides can be observed for the supported carbide catalysts. For NiMoC/Al-SBA-15, only the diffuse peaks of noncrystalline silica can be observed. This indicates that the crystallite sizes of Ni/Mo carbides or oxides are below the lower limit for XRD detectability (5 nm), or that amorphous metal carbides or oxides were formed 23.

Figure 3:
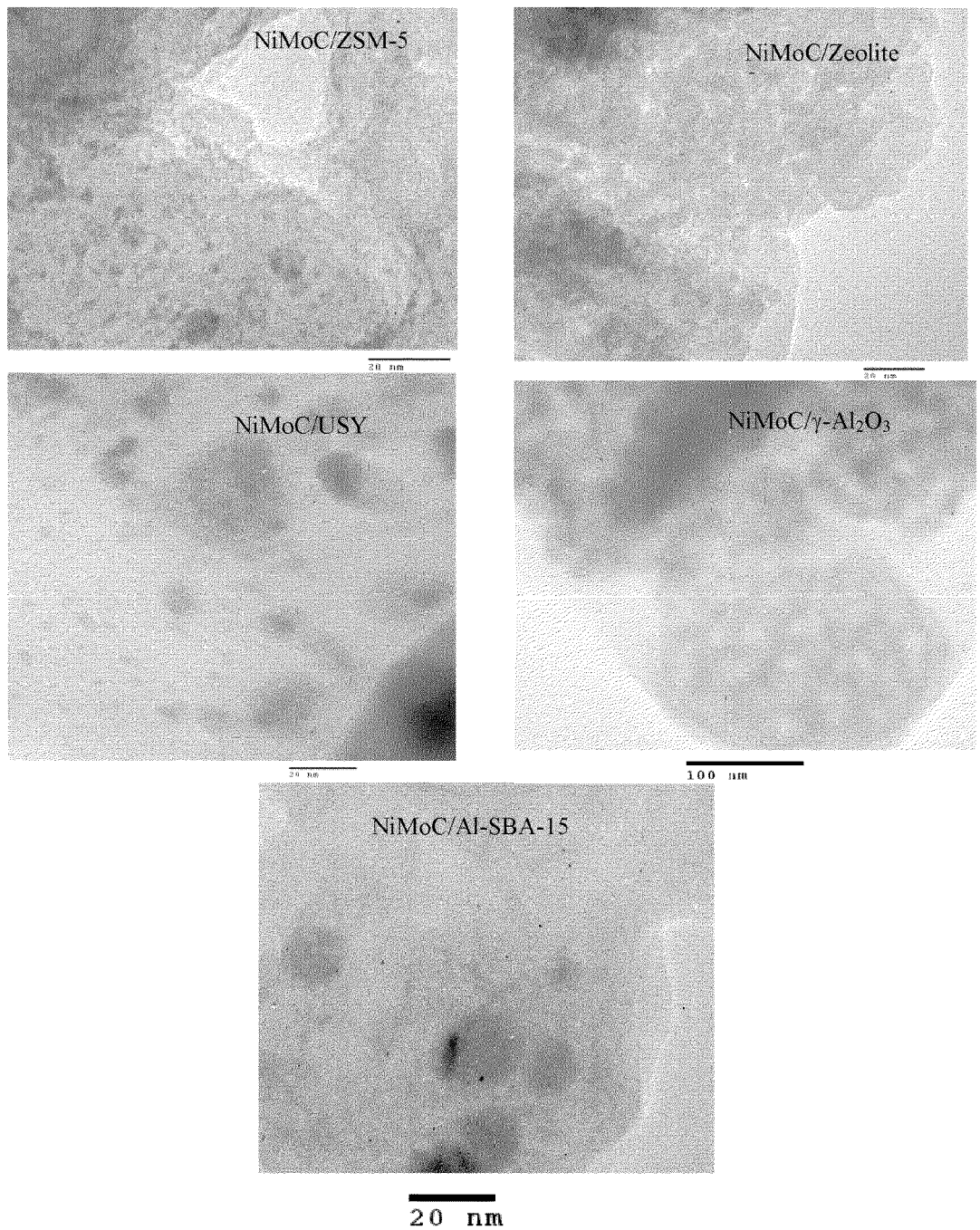
FIG. 3 illustrates the transmission electron micrographs (TEM) of NiMoC/ZSM-5, NiMoC/Zeolite β, NiMoC/USY, NiMoC/γ-$Al_2O_3$ and NiMoC/Al-SBA-15.

FIG. 3 shows the transmission electron micrographs (TEM) of NiMoC/ZSM-5, NiMoC/Zeolite β, NiMoC/USY, NiMoC/γ-$Al_2O_3$ and NiMoC/Al-SBA-15. TEM images of the catalysts confirmed their nanostructure. The black spots on the images denote the metallic particles (NiMo carbides and/or oxides) on the support. The metallic particles have irregular shapes on zeolite β and γ-$Al_2O_3$. A comparison of the five supports indicates that the Al-SBA-15 support possesses the smallest metallic particle size and the particles are well dispersed.

Hydrotreating Activities of the Catalysts

Figure 4:
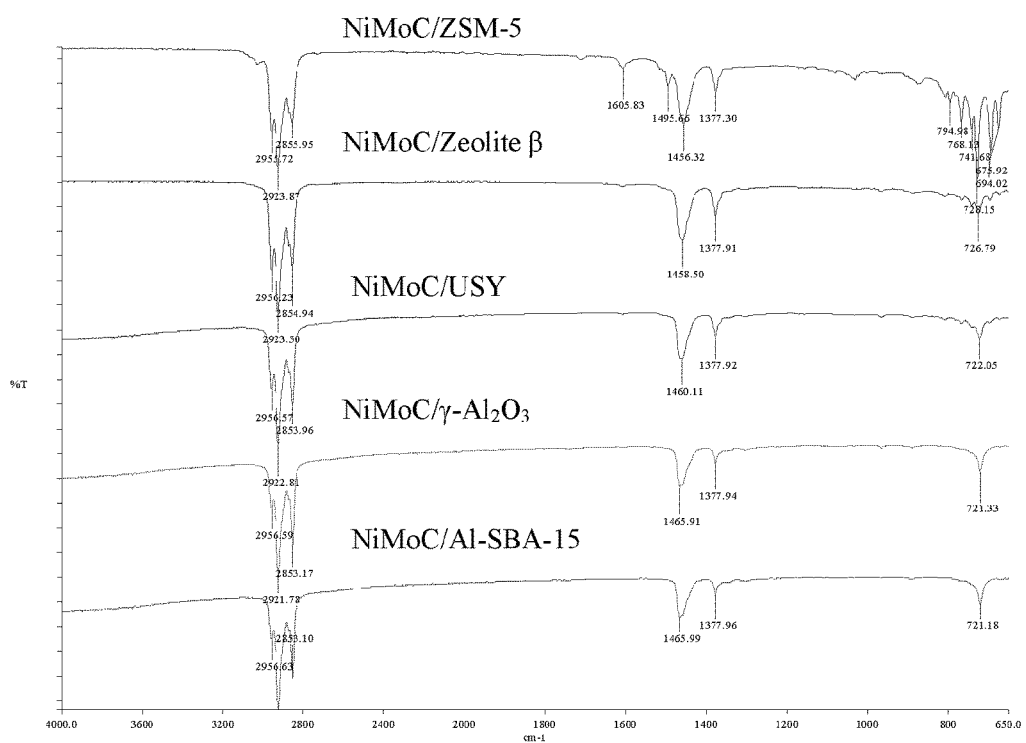
FIG. 4 illustrates FTIR spectra of the OLPs over the five supported NiMoC catalysts.

The effect of the catalyst supports was correlated with their hydrotreating catalytic activity in the 400° C. reaction temperature range and at 650 psi. The conversion of triglycerides was determined by monitoring the concentration of triglycerides in the products and was found to be 100% for all five catalysts. It can be seen from FIG. 4 that neither carboxyl nor ester group absorption could be found on the FTIR spectra of the OLPs from all of the catalysts. Therefore, both triglycerides and free fatty acids in the feedstock were converted. In addition to complete conversion, the basic composition of the soybean oil hydrotreating products was similar for all catalysts used. The reaction yields an organic liquid product (OLP), together with gaseous products and water. Beside hydrocarbon fuels, the OLP also contained other side products, such as partially converted triglycerides, oxygenates, monomers, dimers and tars. The gaseous products were composed unreacted hydrogen, carbon monoxide, carbon dioxide and small hydrocarbon molecules (C1-C4).

Figure 5A:
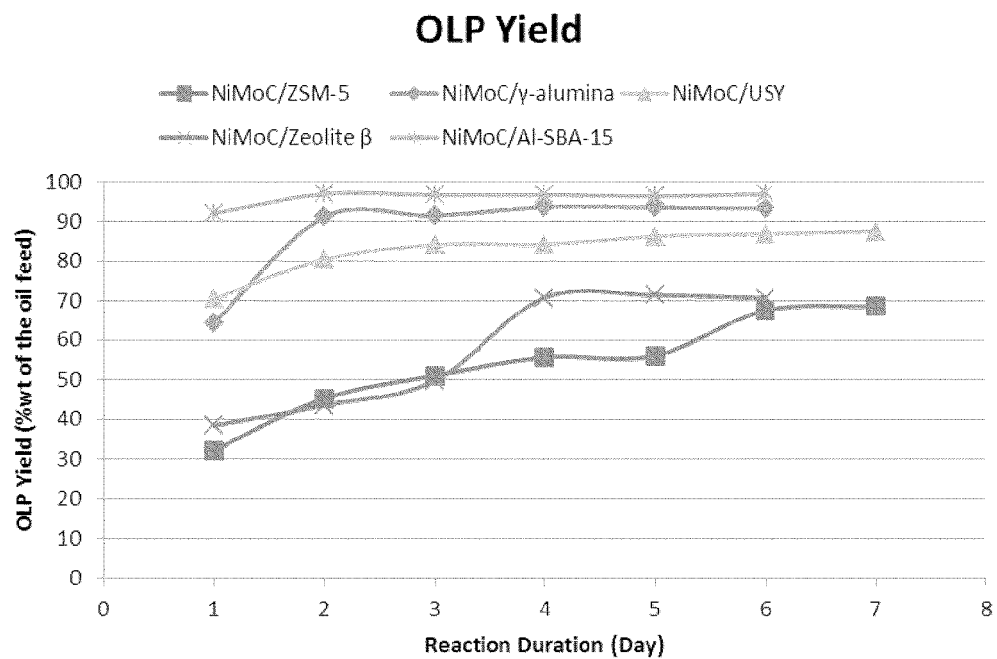
FIG. 5(a) illustrates the organic liquid product (OLP) yield.
Figure 5B:
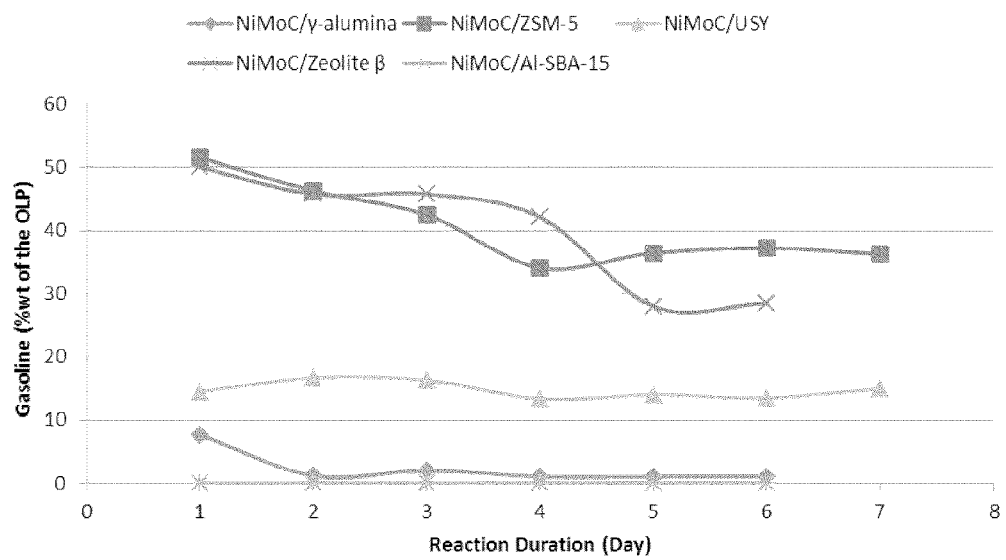
FIG. 5(b) illustrates the gasoline selectivity in OLP.
Figure 5C:
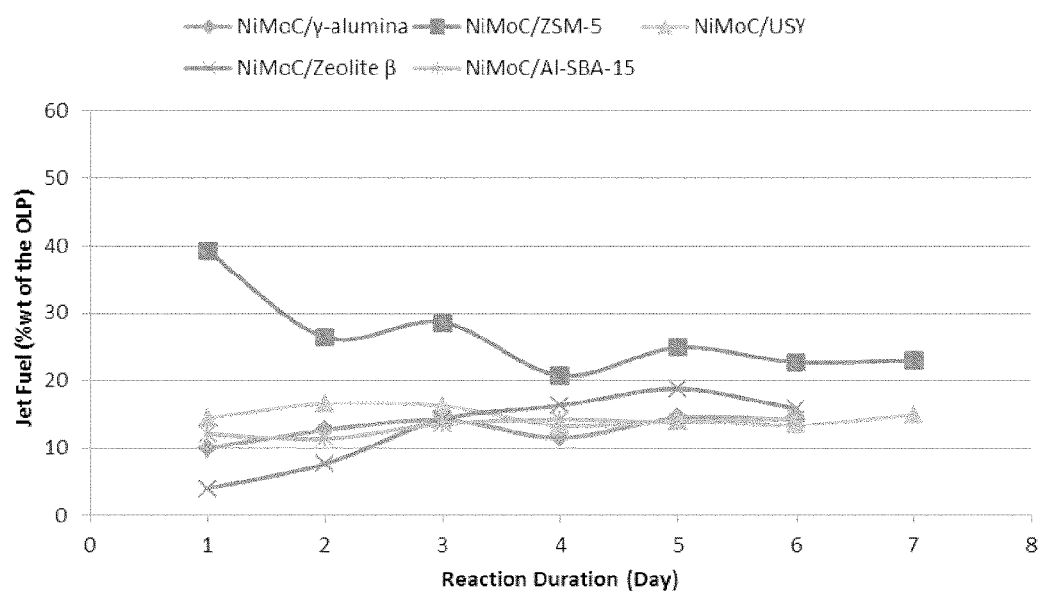
FIG. 5(c) illustrates the jet fuel selectivity in OLP.

The OLP yields and selectivities to gasoline, kerosene/jet, and diesel hydrocarbons are given in FIG. 5(a)-(d). It can be seen in FIG. 5(a) that the OLP yields from NiMoC/Al-SBA-15 and NiMoC/γ-Al$_2$O$_3$ are greater than those from the zeolite supported catalysts, NiMoC/ZSM-5, NiMoC/Zeolite β and NiMoC/USY. This is likely due to the meso-structure of Al-SBA-15 and γ-Al$_2$O$_3$, which can provide a larger diffusion space for the large triglyceride molecules (around 5.3-7.4 Å longitudinal section diameter and 30-45 Å chain length) than the micro-porous supports. NiMoC/Al-SBA-15 shows the highest yield of OLP as it has the largest pore size. FIG. 5(a) also shows that among the micro-porous materials, OLP yield from NiMoC/USY is higher than from NiMoC/ZSM-5, NiMoC/Zeolite β. This might be due to the higher specific adsorption capacity of NiMoC/USY than that of NiMoC/ZSM-5 or NiMoC/Zeolite β. A higher specific adsorption capacity could be a result of more numerous active sites on the catalyst surface.

The hydrotreating activity results indicate that a lower gas yield was obtained with mesoporous molecular sieve (SBA-15) and amorphous alumina (γ-Al$_2$O$_3$) based catalysts as compared with zeolites based catalysts. The liquid yield was very low (60-80%) for zeolite based catalysts as compared with γ-Al$_2$O$_3$ and SBA-15 supported catalysts (90% and 96% respectively). It was reported that lighter compounds such as gaseous hydrocarbons and gasoline range hydrocarbons are mainly produced from the secondary cracking during the catalytic cracking process of vegetable oils. Micro-porous catalysts provide smaller channels and a longer diffusion path for reactant molecules than meso-porous ones. Therefore, micro-porous supports, ZSM-5, Zeolite β, USY can provide more cracking sites for gasoline production reactions than Al-SBA-15 and γ-Al$_2$O$_3$. It can be seen from FIG. 5(b) that 20-50% of gasoline range hydrocarbons in the OLP were obtained over the zeolite supported catalysts, NiMoC/ZSM-5, NiMoC/USY and NiMoC/Zeolite β while almost no gasoline was produced over the other two non-zeolite supported catalysts, NiMoC/Al-SBA-15 and NiMoC/γ-Al$_2$O$_3$. In comparison with NiMoC/ZSM-5, NiMoC/USY and NiMoC/Zeolite β, it can be seen that NiMoC/ZSM-5 and NiMoC/Zeolite β yield more gasoline range hydrocarbons than NiMoC/USY. The explanation can be found by considering the pore volumes of the catalysts, as shown in Table 2. The pore volume of NiMoC/USY is the highest at 0.25 cm$^{-3}$/g; while NiMoC/ZSM-5 and NiMoC/Zeolite β are only 0.13 and 0.09 cm$^{-3}$/g, respectively. The diffusion of the triglyceride molecule within the large pore volume catalyst is much easier and therefore the secondary cracking is limited. Thus, less gasoline products were obtained over the larger pore volume catalyst (NiMoC/USY) than over the NiMoC/ZSM-5 and NiMoC/Zeolite β catalysts.

Figure 5D:
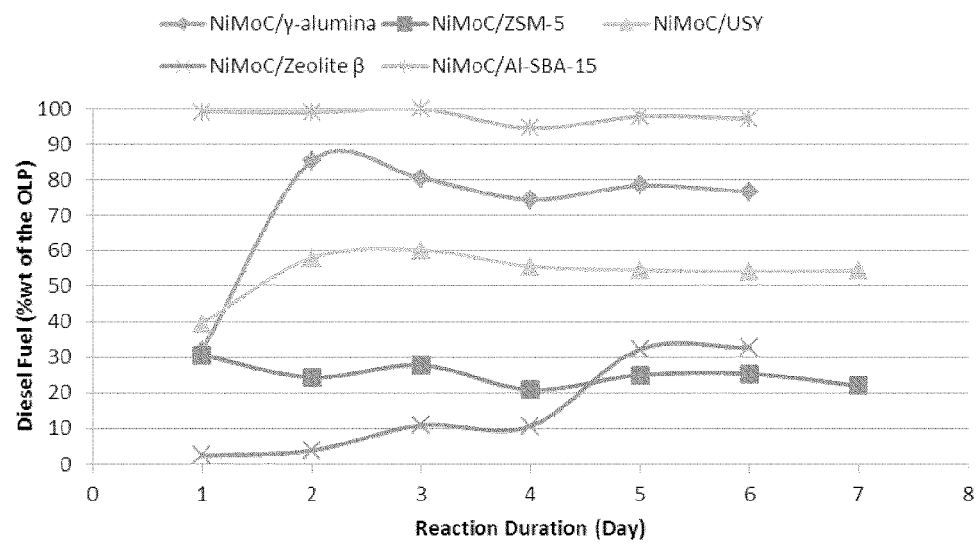
FIG. 5(d) illustrates the diesel fuel selectivity in OLP.

Diesel range hydrocarbons were mainly obtained as a result of the preferential removal of the oxygen from the triglyceride molecules by decarbonylation, decarboxylation and/or hydrodeoxygenation. Therefore, the pore structure of catalysts plays an important role in controlling the diesel selectivity. A smaller pore structure will cause more secondary cracking of heavy hydrocarbons and lead to a lower diesel selectivity. The larger porestructure of mesoporous supports as compared with zeolites makes them excellent candidates for applications where large organic molecules, such as triglycerides, are accessible to the well dispersed active sites located inside the pores. As shown in FIG. 5(d), NiMoC/Al-SBA-15 and NiMoC/γ-Al$_2$O$_3$ have higher selectivities to diesel range hydrocarbons than NiMoC/ZSM-5, NiMoC/Zeolite β and NiMoC/USY. Furthermore, NiMoC/Al-SBA-15 is superior to NiMoC/γ-Al$_2$O$_3$ with regard to selectivity for diesel range hydrocarbons (~97%) under the conditions tested. The organic liquid product consisted predominantly of n-alkanes ($C_{15}$-$C_{18}$), and only minor amounts of iso-alkanes and olefins were found. This may be due to the different channel properties of these two catalysts as shown in FIG. 3. NiMoC/Al-SBA-15 has a regular and uniform channel structure. Therefore, reactant diffusion inside the pores is easy and smooth. NiMoC/γ-Al$_2$O$_3$ has a meso-porous structure. However, its channel is non-uniform and irregular. Therefore, reactant diffusion inside the pores is not uniform. In contrast to the supports of mesoporous alumina (γ-Al$_2$O$_3$) and microporous molecular sieves (zeolites), the mesoporous molecular sieve support (SBA-15) also has a very high specific surface area (Table 2) which allows very high dispersions and loadings of the supported active phase. So, NiMoC/Al-SBA-15 has the highest activity and selectivity to diesel hydrocarbons than other four catalysts.

The activities of a series of NiWC/Al-SBA-15 catalysts were also studies. First, as shown in Table 3 below, the conversion of corn oil to OLP for the first day is high for every NiWC/Al-SBA-15 catalyst tested except for the Ni—W ratio of 1:9, which indicates that catalysts need to have a minimum Ni content for hydrogen activation. The catalysts with Ni—W ratios of 1:1 and 2:1 were deactivated quickly due to the poisoning by tar. The catalyst with Ni—W ratio of 9:1 showed the best conversion of corn oil (100% for the first two days) and showed a significant resistance against deactivation. The selectivity to diesel products ($C_{12}$-$C_{22}$) was low for every ratio except for the Ni—W ratio of 9:1 (almost 100% for the first two days).

TABLE 3

| Gas Chromatography Analysis of Catalytic Products | | | | |
|---|---|---|---|---|
| NiWC Catalysts | Conversion of Corn Oil | | Selectivity to Diesel Products ($C_{12}$-$C_{22}$) (%) | |
| Ni—W Ratio | First Day | Second Day | First Day | Second Day |
| 1:9 | 29.6 | 31.2 | 47.7 | 34.1 |
| 1:1 | 99.8 | 23.4 | 83.7 | 73.5 |
| 2:1 | 95.1 | 17.5 | 62.9 | 55.4 |
| 9:1 | 100 | 100 | 100 | 98.5 |

Figure 6:
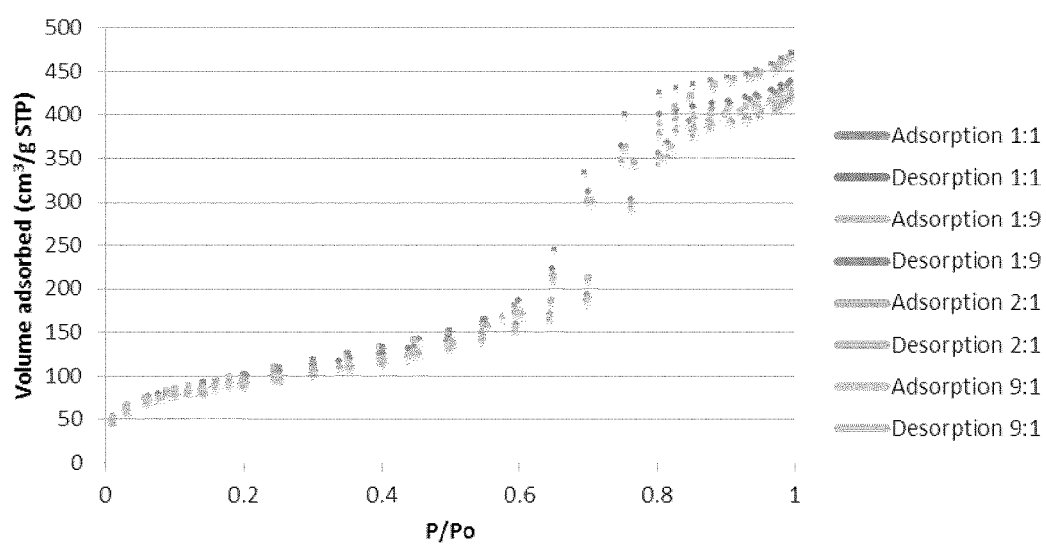
FIG. 6 illustrates the Brunauer-Emmett-Teller (BET, indicating the surface areas of the catalysts) and Barrett-Joyner-Halenda (BJH, indicating the pore sizes and pore volumes of the catalysts) determination of the NiWC/Al-SBA-15 catalysts.

Various catalyst characterization studies were conducted in order to investigate the reason that makes the NiWC/Al-SBA-15 catalyst with a Ni—W ratio of 9:1 the best catalyst among the ones tested for converting corn oil to diesel. As shown in Table 4 below and in FIG. 6, typical adsorption isotherms with a H1 hysteresis by the IUPAC classification were observed for all four NiWC/Al-SBA-15 catalysts, which is associated with the presence of a mesoporous matrix (Al-SBA-15). The values of surface area, pore size, and pore volume showed no significant difference for all four catalysts, which indicates that the surface area, pore size, and pore volume of the NiWC/Al-SBA-15 catalysts tested have no significant effect on the catalyst activity.

TABLE 4

Textural Properties of NiWC Catalysts with Various Ni—W Ratios

| Ni—W Ratio | $S_{BET}$ (m$^2$/g) | Pore Size (nm) | Pore Volume (cm$^3$/g) |
|---|---|---|---|
| 1:9 | 376 | 6.91 | 0.74 |
| 1:1 | 361 | 7.30 | 0.69 |
| 2:1 | 342 | 7.32 | 0.66 |
| 9:1 | 340 | 7.13 | 0.67 |

Figure 7:
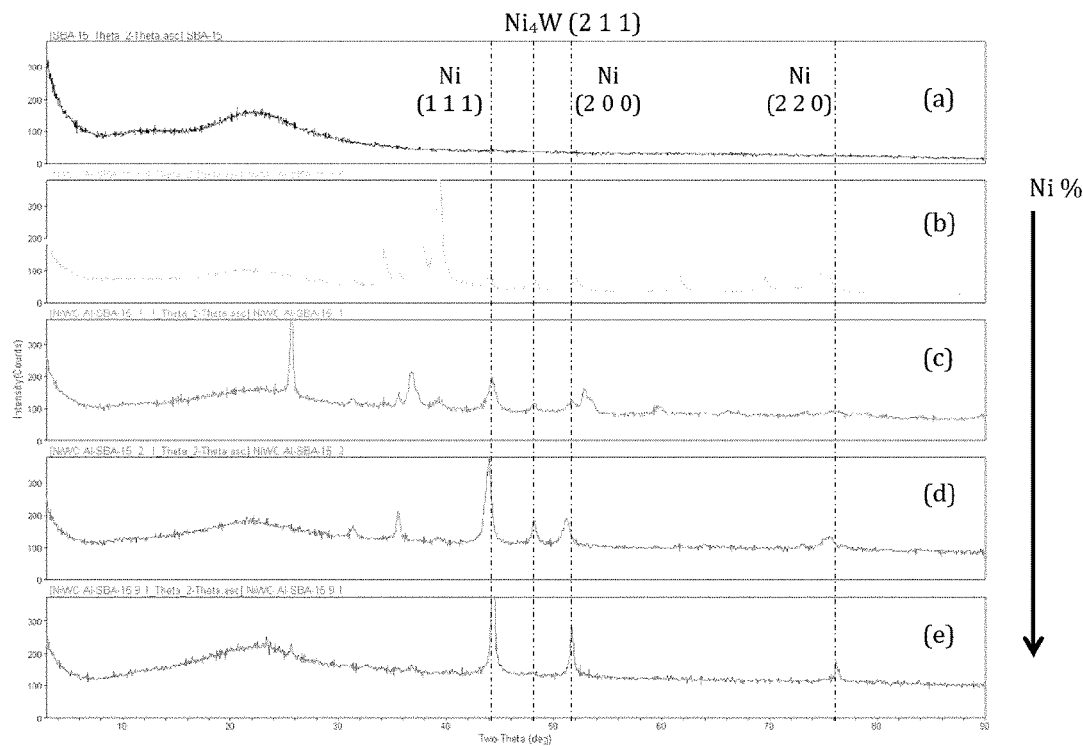
FIG. 7 illustrates the X-ray diffraction spectrograms of the Al-SBA-15 support and the NiWC/Al-SBA-15 catalysts (a) Al-SBA-15 support, (b) Ni—W=1:9, (c) Ni—W=1:1, (d) Ni—W=2:1, and (e) Ni—W=9:1.

As shown in FIG. 7, the first pattern (a) of the X-ray diffraction study showed the surface structure of the support (Al-SBA-15). There is no peak appeared because Al-SBA-15 is mesoporous, which has no crystal on the surface. There are three main peaks appeared on the catalyst patterns (b, c, d, and e) that correspond to Ni. Those peaks are at 2θ (44.2°, 51.9°, and 76.1°). The intensities of those peaks were increasing as Ni content increases. The remaining peaks correspond to W carbides except for the peak at 2θ (48.1° which corresponds to NiW alloys. The alloy is Ni$_4$W with a structure of (2 1 1). This peak was increasing with increasing Ni content for all catalyst ratios except the Ni—W ratio of 9:1. The peak disappeared in the Ni—W ratio of 9:1 which indicated that there is no alloy formed in this catalyst.

Figure 8:
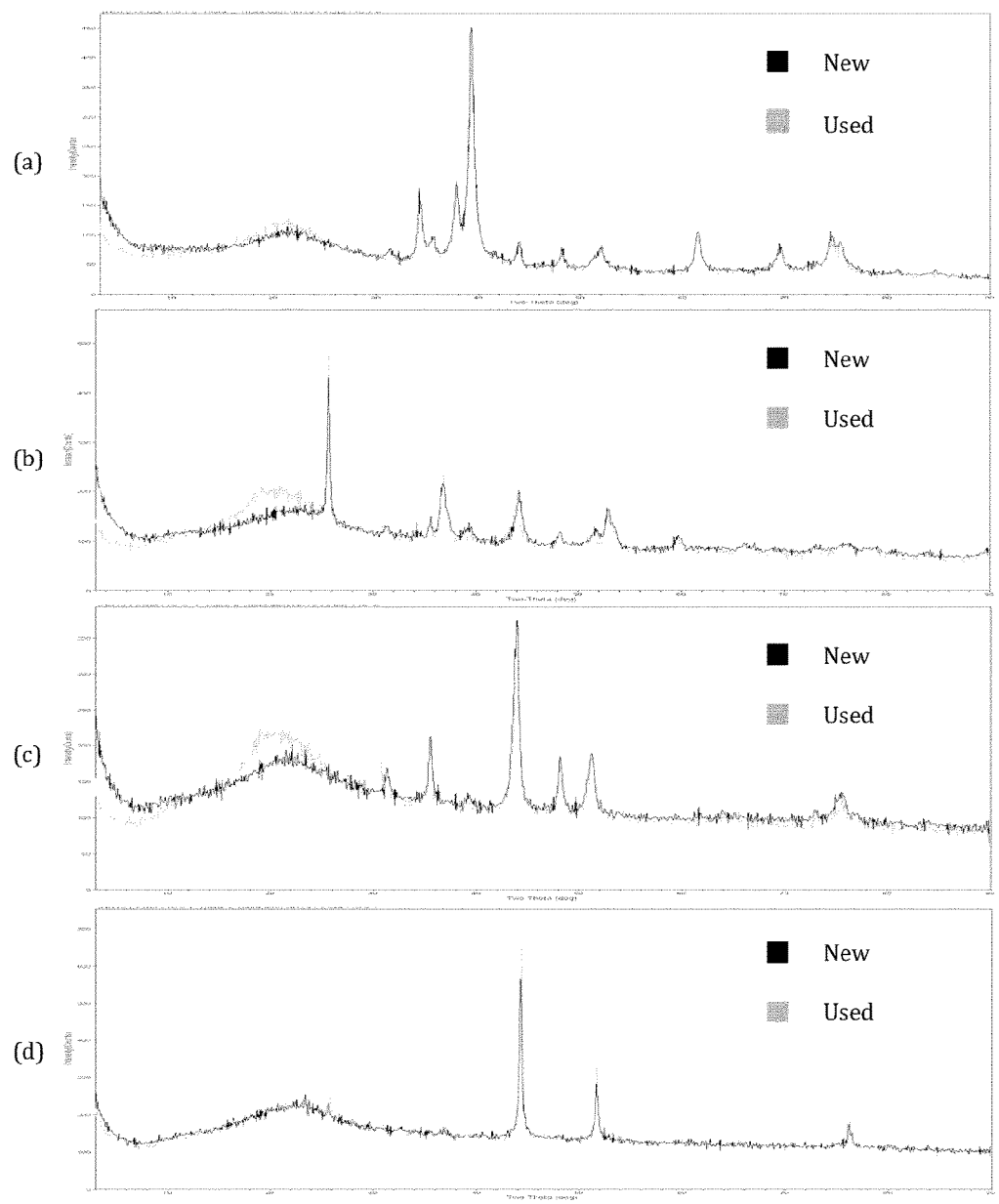
FIG. 8 illustrates the X-ray diffraction spectrograms of new and used NiWC/Al-SBA-15 catalysts (a) Ni—W=1:9, (b) Ni—W=1:1, (c) Ni—W=2:1, and (d) Ni—W=9:1.

As shown in FIG. 8, the X-ray diffraction study on new (prior to conversion reaction) and used (after two days catalyzing conversation reaction) NiWC/Al-SBA-15 catalysts showed that catalysts with Ni—W ratios of 1:1 and 2:1 experienced changes in their structures after two days of conversion reaction of corn oil to OLP. It could be recognized that there is a peak shift in each pattern of Ni—W ratios of 1:1 and 2:1 which indicated that the catalysts were not stable. The most stable catalyst among the ones tested was the catalyst with Ni—W ratio of 9:1 because the pattern of new and used catalysts are identical which indicated that the catalyst is stable and there is no significant change in its structure.

Scanning Electron Microscopy (SEM) and Energy Dispersive Spectroscopy (EDS) studies were carried out to map the catalyst and determine both Ni and W distributions on the support (Al-SBA-15). The SEM and EDS spectrograms showed that Ni particles distributed well over the support. There was no observed Ni particle aggregation at any area of the support which indicates that Ni particles were well dispersed on the support. On the other hand, W particles showed very poor distribution especially for the catalysts that have high W content. The spectrograms showed that W particle aggregation decreased as W content decreased. The data indicated that the surface energy of W particle is higher than the surface energy of Ni particle which makes the W particles tend to aggregate.

In one embodiment, this disclosure provides a series of new catalysts for hydrotreating of fats and oils that can be used for production of biofuels, especially green diesel, which were prepared through impregnation method followed by carburization of metal oxide precursors through temperature-programmed reaction (TPR) conducted in a reactant gas stream (20% $CH_4/H_2$). These catalysts are bimetal carbide catalysts (Mo- or W-based carbides promoted with Ni or Co) supported on Al-SBA-15. It provides the potential to convert all kinds of oil feedstocks into green diesel fuels.

At present, two types of catalysts have been reported as effective hydroprocessing catalysts in converting vegetable oils to diesel range hydrocarbons: supported noble metal catalysts (Pd or Pt) and sulfided bimetallic catalysts (usually Mo- or W-based sulfides promoted with Ni or Co). However, there are disadvantages of using these catalysts. On one hand, the limited availability and high price of noble metal catalysts has made the process economically not viable. Furthermore, since noble metal catalysts are very sensitive to catalyst poisons, contaminates (such as oxygenated compounds) in feedstock can cause significant deactivation of the catalysts. Therefore, it is necessary to remove impurities from the feedstock before the reaction. On the other hand, the products obtained in the mentioned processes over the bimetallic aluminum oxide supported catalysts are essentially n-paraffins (n-$C_{15}$ up to n-$C_{18}$) solidifying at subzero temperatures and as such they are unsuitable for high quality diesel fuels, kerosene and gasoline compounds. More importantly, the base metals in these hydrotreating catalysts need to be maintained in their sulfided form in order to be active at process conditions, and therefore a sulfurization co-feed needs to be added to the feedstock.

According to another embodiment of the present disclosure, the disclosed novel technology utilizes the carbides of early transition metals which can exhibit high activity similar to the noble metals because the introduction of carbon or nitrogen into the lattice of the early transition metals results in an increase of the lattice parameter $a_0$ and leads to an increase in the d-electron density. These developed catalysts exhibited excellent activity and selectivity for hydrodeoxygenation of triglycerides and free fatty acids. And the application of the technology eliminates the need to add a sulfur compound to a biomass-derived feedstock.

According to yet another embodiment of the present disclosure, the disclosed novel technology differs from existing technologies in the following aspects.

(1) Catalyst property. The catalysts have active sites of bimetallic carbides for hydrogenation and Al-SBA-15 support for hydrodeoxygenation on the catalyst surface. And the amount of active sites and catalytic strength are moderated by the amount of metal loadings.

Until now, it appears that there is no report about using bimetallic carbide catalysts for hydroprocessing of biomass to green diesel. In this disclosure, bimetal carbide catalysts (Mo- or W-based carbides promoted with Ni or Co) was used for the hydroprocessing of fresh or used oils.

For traditional hydroprocessing catalysts, normally amorphous γ-alumina was used for the support, which has a relatively low surface area (around 180 m$^2$/g). In this disclosure, a new kind of mesoporous support, Al-SBA-15, was synthesized. The synthesized SBA-15 possesses an extremely large surface area (in some instances, more than 1000 m$^2$ g$^{-1}$) and ultra large pore size. These features are responsible for the advantages of using it as acid-catalyzed reactions of large molecules, especially hydroprocessing of biomass feedstocks.

(2) Catalyst activity. The highest yield of green diesel reported is about 80% over the commercial hydrocracking catalyst by using fresh cooking oil as the feedstock in the flow reactor. In this disclosure, about 95% yield of green diesel was obtained by hydroprocessing of soybean oil in the flow reactor.

(3) Catalyst life. There are few reports about catalyst life in green diesel production. The longest life reported is $Mo_2N/\gamma$-$Al_2O_3$ catalyst (450 h) with pure canola oil. In our recent data, the catalysts maintained the high activity even after 840 h reaction in continuous reactor system with pure soybean oil.

(4) Catalytic process. By using standard hydroprocessing catalysts including sulfided cobalt molybdenum (Co—Mo) or nickel molybdenum (Ni—Mo), a high hydrogen pressure was employed to get a high yield of green diesel and maintain the catalyst activity, which could be as high as 2200 psi. In this disclosure, high yield of green diesel was obtained under a low hydrogen pressure of 650 psi, which reduces the investment, operating cost and severity of the process.

(5) Oil feedstocks. The oil feedstocks used in the reported hydroprocessing processes are high quality oils, such as high purity canola oil and rapeseed oil. Normally sulfurization reagent is added to the biomass feedstocks to maintain the catalyst activity. Until now, there is only limited report about using the commercialized hydroprocessing catalyst to convert used cooking oil co-fed with sulfur into biofuels.

The oil feedstocks that may be used in the system according to one embodiment of the present disclosure are non-sulfur co-fed oils, either food grade oils or inexpensive oils, such as waste cooking oil, waste corn oil, soybean oil, soybean oil mixed with fatty acids, yellow grease, brown grease, crude vegetable oil, rendered animal fats, crude algae oil, which generally contain a high FFA content, high water content and other impurities, like metal ions, bio-gel. No sulfurization reagent is needed for the feedstocks.

According to one embodiment of the present disclosure, this novel technology has the potential to make green diesel production more profitable. This new technology serves three purposes for green diesel production: being able to use unrefined or waste oils in green diesel production, and developing an active hydroprocessing catalyst for green diesel production.

For green diesel production, reducing the cost of oil feedstock has substantial impact on the economics. From the catalyst aspect, traditional methods use sulfided catalysts which usually result in engineering and environmental problems, as well as considerable cost in separating them from the final product. Using carbide catalysts can alleviate these problems and reduce the process cost by using milder reaction conditions.

According to another embodiment of the present disclosure, the novel catalysts can convert unrefined or waste oils into green diesel. It can substantially reduce the production cost of green diesel.

The disclosed novel catalysts are highly active, low cost, and minimize the environmental problems caused by sulfurization reagents in the traditional hydroprocessing reaction. The hydroprocessing catalysts have the ability to convert fresh and waste oils into green diesel at a high yield and low cost. They can be used in the current oil refinery facilities and greatly benefit many oil companies in US.

The hydrotreating of soybean oils on supported NiMo carbide catalysts makes possible the production of gasoline to diesel range liquid hydrocarbons. Because of specific pore structures, all of the zeolite-supported catalysts have a strong cracking activity by producing more gaseous and gasoline products. The meso-porous $\gamma$-$Al_2O_3$ and Al-SBA-15 supported catalysts led to a higher production of green diesel, containing mostly C15-C18 hydrocarbons, which are mainly formed by decarboxylation/decarbonylation and/or hydrodeoxygenation reactions, respectively. The high surface area, large porosity and regular channel structure of the A-lSBA-15 supported catalyst led to high conversion (100%) and selectivity to green diesel (97%), in the hydrotreating of soybean oil at 400° C., 650 psi, and oil LSHV=1, during 7 days of reaction. When compared with other reported hydrotreating catalysts, the NiMoC/Al-SBA-15 catalyst showed the highest hydrotreating activity and selectivity to diesel hydrocarbons. The results showed that the NiMoC/Al-SBA-15 could be considered as a promising catalytic system for hydrotreating vegetable oil to green diesel.

References, all of which are incorporated by reference herein:

(1) Stumborg, M.; Wong, A.; Hogan, E., Hydroprocessed Vegetable Oils for Diesel Fuel Improvement. *Bioresource Technology* 1996, 56, (1), 13-18.

(2) Huber, G. W.; Corma, A., Synergies between Bio- and Oil Refineries for the Production of Fuels from Biomass. *Angewandte Chemie International Edition* 2007, 46, (38), 7184-7201.

(3) Egeberg, G. R.; Michaelsen, H. N.; Skyum, L., Novel Hydrotreating Technology for Production of Green Diesel. presented at ERTC 2009.

(4) Koivusalmi, E.; Piilola, R.; Aalto, P., Process for Producing Branched Hydrocarbons. United States Patent Publication 0302001 2008.

(5) Egeberg, R. G.; Knudsen, K., Industrial-Scale Production of Renewable Diesel. Published in PTQ Q3 2011.

(6) Mäki-Arvela, P.; Kubickova, I.; Snare, M.; Eränen, K.; Murzin, D. Y., Catalytic Deoxygenation of Fatty Acids and Their Derivatives. Energy & Fuels 2006, 21, (1), 30-41.

(7) Ma□ki-Arvela, P. i.; Rozmyslowicz, B.; Lestari, S.; Simakova, O.; Era□nen, K.; Salmi, T.; Murzin, D. Y., Catalytic Deoxygenation of Tall Oil Fatty Acid over Palladium Supported on Mesoporous Carbon. Energy & Fuels 2011, 25, (7), 2815-2825.

(8) Murata, K.; Liu, Y.; Inaba, M.; Takahara, I., Production of Synthetic Diesel by Hydrotreatment of Jatropha Oils Using Pt—Re/H-ZSM-5 Catalyst. *Energy & Fuels* 2010, 24, (4), 2404-2409.

(9) Sotelo-Boyás, R.; Liu, Y.; Minowa, T., Renewable Diesel Production from the Hydrotreating of Rapeseed Oil with Pt/Zeolite and NiMo/$Al_2O_3$ Catalysts. *Industrial & Engineering Chemistry Research* 2010, 50, (5), 2791-2799.

(10) Han, J.; Duan, J.; Chen, P.; Lou, H.; Zheng, X.; Hong, H., Nanostructured Molybdenum Carbides Supported on Carbon Nanotubes as Efficient Catalysts for One-Step Hydrodeoxygenation and Isomerization of Vegetable Oils. *Green Chemistry* 2011, 13, (9), 2561-2568.

(11) Monnier, J.; Sulimma, H.; Dalai, A.; Caravaggio, G., Hydrodeoxygenation of Oleic Acid and Canola Oil over Alumina-Supported Metal Nitrides. *Applied Catalysis A: General* 2010, 382, (2), 176-180.

(12) Furimsky, E., Metal Carbides and Nitrides as Potential Catalysts for Hydroprocessing. *Applied Catalysis A: General* 2003, 240, (1-2), 1-28.

(13) Zhang, W.; Zhang, Y.; Zhao, L.; Wei, W., Catalytic Activities of NiMo Carbide Supported on $SiO_2$ for the Hydrodeoxygenation of Ethyl Benzoate, Acetone, and Acetaldehyde. *Energy & Fuels* 2010, 24, (3), 2052-2059.

(14) Scherzer, J.; Gruia, A. J., Hydrocracking Science and Technology. 1st Edition. CRC Press. ISBN 0-8247-9760-4. 1996.

(15) Ancheyta, J.; Speight, J. G., Hydroprocessing of Heavy Oils and Residua. 1st Edition. CRC Press. ISBN 0-8493-7419-7 2007.

(16) Nasikin, M.; Susanto, B. H; Hirsaman, M A.; Wijanarko, A., Biogasoline from Palm Oil by Simultaneous Cracking and Hydrogenation Reaction over NiMo/zeolite Catalyst. *World Applied Sciences Journal* 2009, 5 (Special Issue for Environment).

(17) Wu, S.; Huang, J.; Wu, T.; Song, K.; Wang, H.; Xing, L.; Xu, H.; Xu, L.; Guan, J.; Kan, Q., Synthesis, Characterization, and Catalytic Performance of Mesoporous Al-SBA-15 for Tert-butylation of Phenol. *Chinese Journal of Catalysis* 2006, 27, (1), 9-14.

(18) Iglesia, E.; Ribeiro, F. H.; Boudart, M.; Baumgartner, J. E., Synthesis, Characterization, and Catalytic Properties of Clean and Oxygen-Modified Tungsten Carbides. *Catalysis Today* 1992, 15, (2), 307-337.

(19) Lee, J. S.; Oyama, S. T.; Boudart, M., Molybdenum Carbide Catalysts.1. Synthesis of Unsupported Powders. *Journal of Catalysis* 1987, 106, (1), 125-133.

(20) Lee, J. S.; Boudart, M., In Situ Carburization of Metallic Molybdenum during Catalytic Reactions of Carbon-Containing Gases. *Catalysis Letters* 1993, 20, (1), 97-106.

(21) Claridge, J. B.; York, A. P. E.; Brungs, A. J.; Green, M. L. H., Study of the Temperature-Programmed Reaction Synthesis of Early Transition Metal Carbide and Nitride Catalyst Materials from Oxide Precursors. *Chemistry of Materials* 2000, 12, (1), 132-142.

(22) Sing, K. S. W.; Everett, D. H.; Haul, R. A. W.; Moscou, L.; Pierotti, R. A.; Rouquerol, J.; Siemieniewska, T., Reporting Physisorption Data for Gas/Solid Systems with Special Reference to the Determination of Surface Area and Porosity (Recommendations 1984). *Pure and Applied Chemistry* 57, (4), 603-619.

(23) Panpranot, J.; Kaewkun, S.; Praserthdam, P.; Goodwin, J. G., Effect of Cobalt Precursors on the Dispersion of Cobalt on MCM-41. *Catalysis Letters* 2003, 91, (1), 95-102.

(24) Ma, X.; Kim, J. H.; Song, C., Effect of Methyl Groups at 4- and 6-Positions on Adsorption of Dibenzothiophenes over CoMo and NiMo Sulfide Catalysts. *Fuel Chemistry Division Preprints* 2003, 48, (1), 135-137.

(25) Leng, T. Y.; Mohamed, A. R.; Bhatla, S., Catalytic conversion of palm oil to fuels and chemicals. *Canadian Journal of Chemical Engineering* 1999, 77, (1), 156-162.

(26) Kubička, D.; Šimáček, P.; Žilková, N., Transformation of Vegetable Oils into Hydrocarbons over Mesoporous-Alumina-Supported CoMo Catalysts. *Topics in Catalysis* 2009, 52, (1), 161-168.

(27) Corma, A., From Microporous to Mesoporous Molecular Sieve Materials and Their Use in Catalysis. *Chemical Reviews* 1997, 97, (6), 2373-2419.

While the present disclosure has been described with reference to certain embodiments, other features may be included without departing from the spirit and scope of the present disclosure. It is therefore intended that the foregoing detailed description be regarded as illustrative rather than limiting, and that it be understood that it is the following claims, including all equivalents, that are intended to define the spirit and scope of this invention.

The invention claimed is:

1. A catalyst, comprising:
 a carbide or nitride of a metal and a promoter element, the metal selected from the group consisting of Mo, W, Co, Fe, Rh or Mn, and the promoter element selected from the group consisting of Ni, Co, Al, Si, S or P, provided that the metal and the promoter element are different, and
 a mesoporous support having a surface area of at least about 170 $m^2 g^{-1}$, wherein the carbide or nitride of the metal and the promoter element is supported by the mesoporous support, and is in a non-sulfided form and in an amorphous form.

2. The catalyst of claim 1, wherein the support in the presence of the carbide or nitride has a surface area of at least about 450 $m^2 g^{-1}$.

3. The catalyst of claim 1, wherein the support in the presence of the carbide or nitride has a surface area of at least about 700 $m^2 g^{-1}$.

4. The catalyst of claim 1, wherein the support in the presence of the carbide or nitride has a pore volume of at least about 0.1 $cm^3 g^{-1}$.

5. The catalyst of claim 1, wherein the support in the presence of the carbide or nitride has a pore volume of at least about 0.2 $cm^3 g^{-1}$.

6. The catalyst of claim 1, wherein the support in the presence of the carbide or nitride has a pore volume of at least about 0.7 $cm^3 g^{-1}$.

7. The catalyst of claim 1, wherein the metal is Mo.

8. The catalyst of claim 1, wherein the metal is W.

9. The catalyst of claim 1, wherein the promoter element is Ni.

10. The catalyst of claim 1, wherein the promoter element is Co.

11. The catalyst of claim 1, wherein the support is selected from the group consisting of $Al_2O_3$, $SiO_2$, a zeolite, $ZrO_2$, $CeO_2$, a clay, and combinations thereof.

12. The catalyst of claims 11, wherein the support is selected from the group consisting of ZSM-5, zeolite β, USY, γ-$Al_2O_3$, Al-SBA-15, MCM-14, diatomite and combinations thereof.

13. The catalyst of claims 11, wherein the support is Al-SBA-15.

14. The catalyst of claims 1, which is NiMoC supported on Al-SBA-15.

15. The catalyst of claims 1, which is NiMoN supported on Al-SBA-15.

16. The catalyst of claims 1, which is NiWC supported on Al-SBA-15.

17. The catalyst of claims 1, which is NiWN supported on Al-SBA-15.

18. A process, comprising:
 contacting the catalyst of claim 1 with a reaction, the catalyst catalyzing the reaction.

19. The process of claim 18, wherein the reaction is a hydrodeoxygenation reaction.

20. The process of claim 18, wherein the reaction is a hydrocracking reaction.

21. The process of claim 18, wherein the reaction comprises both a hydrodeoxygenation reaction and a hydrocracking reaction, and the catalyst catalyzes both the hydrodeoxygenation reaction and the hydrocracking reaction.

22. A process, the process comprising:
 contacting a material that comprises a glyceride with hydrogen in the presence of the catalyst of claim 1 such that at least some of the glyceride is converted into one or more gasoline to diesel range hydrocarbons, wherein the catalyst catalyzes the hydrocarbon formation.

23. The process of claim 22, wherein the material further comprises a free fatty acid, and wherein at least some of the free fatty acid is converted into one or more gasoline to diesel range hydrocarbons in the presence of the catalyst, wherein the catalyst catalyzes the formation of hydrocarbon.

24. The process of claim 22, wherein the glyceride comprises a triglyceride.

25. The process of claim 22, wherein the glyceride comprises a diglyceride.

26. The process of claim 22, wherein the material is a non-refined oil.

27. The process of claim 22, wherein the material further comprises water, and wherein the water content in the material is more than about 5 weight %.

28. The process of claim 22, wherein the material further comprises one or more free fatty acids, and wherein the free fatty acid content in the material is more than about 10 weight %.

29. A process, the process comprising:
    contacting a material that comprises a free fatty acid with hydrogen in the presence of the catalyst of claim 1 such that at least some of the free fatty acid is converted into one or more gasoline to diesel range hydrocarbons, wherein the catalyst catalyzes the formation of hydrocarbon.

\* \* \* \* \*